US008892177B2

(12) United States Patent
Behzad et al.

(10) Patent No.: US 8,892,177 B2
(45) Date of Patent: *Nov. 18, 2014

(54) MOBILE COMMUNICATION DEVICE WITH LOW POWER SIGNAL DETECTOR

(71) Applicant: Broadcom Corporation, Irvine, CA (US)

(72) Inventors: Arya Behzad, Los Altos, CA (US); Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,477

(22) Filed: Sep. 9, 2013

(65) Prior Publication Data

US 2014/0011552 A1  Jan. 9, 2014

Related U.S. Application Data

(63) Continuation of application No. 11/297,881, filed on Dec. 7, 2005, now Pat. No. 8,532,718.

(60) Provisional application No. 60/723,994, filed on Oct. 6, 2005.

(51) Int. Cl.
 *H04M 1/00* (2006.01)
 *H04W 52/02* (2009.01)

(52) U.S. Cl.
 CPC ............ *H04W 52/0229* (2013.01); *Y02B 60/50* (2013.01); *H04W 52/028* (2013.01)
 USPC ...................... 455/574; 455/552.1; 455/343.2

(58) Field of Classification Search
 CPC ........... H04W 52/0245; H04W 52/028; H04B 1/005; H04B 7/0817
 USPC .......................... 455/552.1, 574, 343.1, 343.2
 See application file for complete search history.

(56) References Cited

U.S. PATENT DOCUMENTS

| 5,280,650 | A | 1/1994 | Sobti |
| 5,487,181 | A | 1/1996 | Dailey et al. |
| 5,615,215 | A | 3/1997 | Utting et al. |
| 5,790,946 | A | 8/1998 | Rotzoll |
| 5,870,673 | A | 2/1999 | Haartsen |

(Continued)

FOREIGN PATENT DOCUMENTS

| CN | 1281319 | 1/2001 |
| CN | 1367623 | 9/2002 |

(Continued)

OTHER PUBLICATIONS

EPO Communication dated Oct. 21, 2010 in Application No. 06012742.0—1246 / 1772977.

*Primary Examiner* — Vladimir Magloire
(74) *Attorney, Agent, or Firm* — Oblon, Spivak, McClelland, Maier & Neustadt, L.L.P.

(57) ABSTRACT

Various embodiments of the present disclosure include a communication device having first circuitry and second circuitry. The first circuitry is capable of operating in a plurality of modes. The second circuitry is capable of determining whether to transition operation of the first circuitry from a sleep mode to a non-sleep mode based at least in part on whether a non-informational characteristic of a received communication signal matches a non-informational characteristic of a particular one of a plurality of communication protocols.

19 Claims, 4 Drawing Sheets

(56) References Cited

U.S. PATENT DOCUMENTS

| | | |
|---|---|---|
| 6,018,647 A | 1/2000 | Fitzgerald |
| 6,192,230 B1 | 2/2001 | van Bokhorst et al. |
| 6,236,674 B1 | 5/2001 | Morelli et al. |
| 6,243,581 B1 | 6/2001 | Jawanda |
| 6,297,768 B1 | 10/2001 | Allen, Jr. |
| 6,678,508 B1 | 1/2004 | Koilpillai et al. |
| 6,990,362 B2 | 1/2006 | Simpson et al. |
| 7,042,858 B1 | 5/2006 | Ma et al. |
| 7,190,679 B2 | 3/2007 | Khawand et al. |
| 7,228,107 B2 | 6/2007 | Kim |
| 7,330,653 B1 | 2/2008 | Roberts et al. |
| 7,430,257 B1 | 9/2008 | Shattil |
| 7,590,432 B2 | 9/2009 | Behzad et al. |
| 8,355,757 B2 | 1/2013 | Rofougaran et al. |
| 2001/0041551 A1 | 11/2001 | Rotzoll |
| 2003/0092451 A1 | 5/2003 | Holloway et al. |
| 2003/0119568 A1 | 6/2003 | Menard |
| 2003/0187484 A1 | 10/2003 | Davis et al. |
| 2003/0214916 A1 | 11/2003 | Khawand et al. |
| 2003/0219035 A1 | 11/2003 | Schmidt |
| 2004/0110508 A1 | 6/2004 | Haartsen |
| 2004/0152419 A1 | 8/2004 | Lee |
| 2005/0043068 A1 | 2/2005 | Shohara et al. |
| 2005/0130713 A1 | 6/2005 | Simpson et al. |
| 2005/0159179 A1 | 7/2005 | Sainton et al. |
| 2006/0063560 A1 | 3/2006 | Herle |
| 2006/0270463 A1 | 11/2006 | Copperman |
| 2007/0060976 A1 | 3/2007 | Denzene et al. |
| 2007/0082647 A1 | 4/2007 | Behzad et al. |
| 2007/0082715 A1 | 4/2007 | Rofougaran et al. |
| 2007/0082716 A1 | 4/2007 | Behzad et al. |
| 2008/0159373 A1 | 7/2008 | Taha et al. |
| 2008/0246656 A1 | 10/2008 | Ghazarian |

FOREIGN PATENT DOCUMENTS

| | | |
|---|---|---|
| EP | 1353447 | 10/2003 |
| WO | 9011652 | 10/1990 |
| WO | 2004042941 | 5/2004 |
| WO | 2004100399 | 11/2004 |

MOBILE COMMUNICATION DEVICE WITH LOW POWER SIGNAL DETECTOR

CROSS-REFERENCE TO RELATED APPLICATIONS/INCORPORATION BY REFERENCE

This application is a continuation of U.S. patent application Ser. No. 11/297,881, entitled "MOBILE COMMUNICATION DEVICE WITH LOW POWER SIGNAL DETECTOR," filed on Dec. 7, 2005, which is related to and claims priority from provisional patent application Ser. No. 60/723, 994 filed Oct. 6, 2005, and titled "MOBILE COMMUNICATION DEVICE WITH LOW POWER SIGNAL DETECTOR," the contents of which are hereby incorporated herein by reference in their entirety. This patent application is also related to U.S. patent application Ser. No. 11/298,355 filed Dec. 7, 2005, and titled "SYSTEM AND METHOD PROVIDING LOW POWER OPERATION IN A MULTIMODE COMMUNICATION DEVICE", which is hereby incorporated herein in its entirety by reference. This patent application is additionally related to U.S. patent application Ser. No. 11/299,230 filed Dec. 7, 2005, and titled "MOBILE COMMUNICATION DEVICE WITH LOW POWER RECEIVER FOR SIGNAL DETECTION", which is hereby incorporated herein in its entirety by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Mobile communication devices are continually increasing in popularity. Such mobile communication devices include, for example and without limitation, cellular phones, paging devices, portable email devices, and personal digital assistants. Mobile communication devices provide the user with the capability to conduct communications while moving through a variety of environments.

Mobile communication devices typically operate utilizing portable and finite power supplies. Various methods and mechanisms have been developed to operate mobile communication devices in energy-efficient manners. For example, mobile communication devices may be operated in various sleep modes. In one exemplary illustration, a mobile communication device (or portion thereof) may operate in a sleep mode where the mobile communication device occasionally wakes up to determine if there is a communication network available and/or if there are currently messages awaiting delivery to the mobile communication device. In such exemplary sleep mode operation, the mobile communication device wakes up and fully receives and processes communication signals (e.g., through the entire receive path of the mobile communication device). Such full reception and processing expends finite energy resources, even in scenarios where there is no network available for the mobile communication device.

BRIEF SUMMARY OF THE INVENTION

Various aspects of the present invention provide a mobile communication device with a low power signal detector and a method for utilizing a low power signal detector in a mobile communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
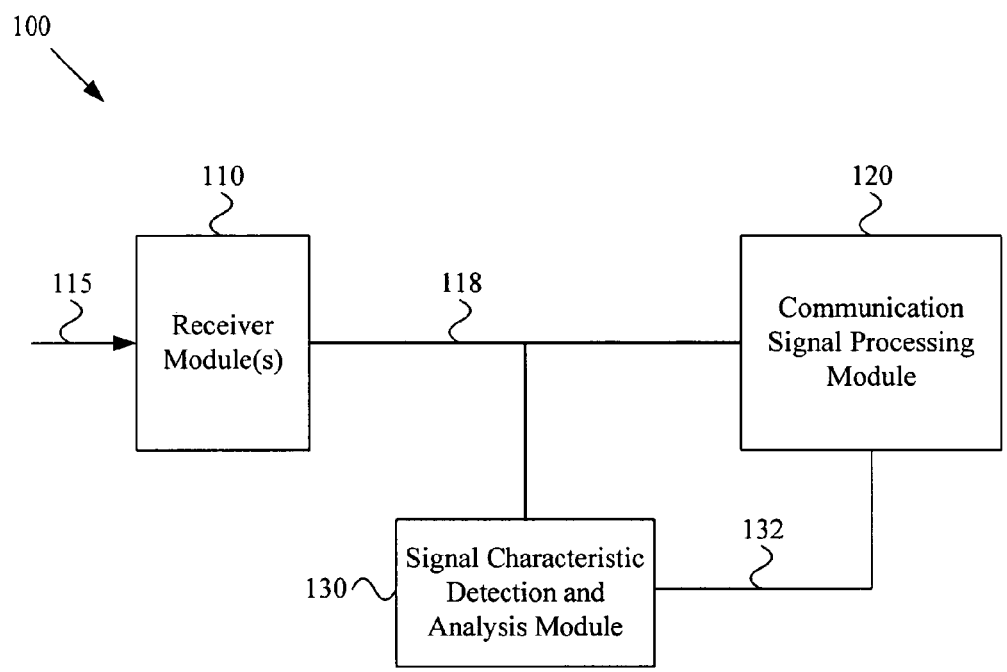
FIG. 1 is a diagram illustrating a portion of a mobile communication device, in accordance with various aspects of the present invention.

FIG. 1 is a diagram illustrating a portion of a mobile communication device 100, in accordance with various aspects of the present invention. The mobile communication device 100 may comprise characteristics of any of a variety of mobile communication device types. For example and without limitation, the mobile communication device 100 may comprise characteristics of a cellular phone, paging device, portable email device, personal digital assistant, portable computer with mobile communication capability, etc.

The exemplary mobile communication device 100 may comprise a receiver module 110 that is adapted to receive at least one communication signal 115. The following discussion may generally discuss a received communication signal 115 as a wireless signal (e.g., an RF signal). However, the communication signal 115 may comprise characteristics of any of a variety of signals associated with various communication media (e.g., a wire signal, RF signal, tethered optical signal, non-tethered optical signal, etc.). Accordingly, the receiver module 110 may comprise characteristics of any of a variety of receivers associated with such signals.

The receiver module 110 may be adapted to receive at least one communication signal 115 communicated in accordance with any of a variety of communications protocols. For example and without limitation, the receiver module 110 may be adapted to receive communication signals communicated in accordance with any or all of GSM/EDGE, GPRS, CDMA, WCDMA, TDMA, PDC, DVB-H, IEEE 802.11, IEEE 802.15, Bluetooth, Zigbee, UltraWideBand, Ethernet, Token Ring, etc.

In a non-limiting exemplary scenario, the receiver module 110 may comprise an antenna and a low-noise amplifier. In such an exemplary scenario, the receiver module 110 may receive an RF signal through the antenna and low-noise amplifier and output the received and amplified RF signal 118 to other circuitry. In another non-limiting exemplary scenario, the receiver module 110 may comprise an antenna, low-noise amplifier and a mixer. In such an exemplary scenario, the receiver module 110 may receive an RF signal through the antenna and low-noise amplifier, mix the received RF signal with a locally generated signal to convert the received RF signal to baseband, and output the received, amplified and converted baseband signal 118 to other circuitry.

The following discussion will include various examples of analyzing a received communication signal. Various examples may apply to an RF communication signal, various examples may apply to a baseband communication signal, and various examples may apply to either of an RF or baseband signal. Additionally, various examples may also apply to various IF communication signals. Thus, the output signal 118 from the receiver module 110 may, depending on the scenario, comprise characteristics of an RF signal, IF signal or baseband signal.

The exemplary mobile communication device 100 may comprise a communication signal-processing module 120 ("CSPM"). The CSPM 120 may, for example, be adapted to operate in one or more sleep modes. The CSPM 120 may also, for example, be adapted to operate in one or more modes that process a received communication signal in any of a variety of manners.

For example, in a non-limiting exemplary scenario, the CSPM 120 may be adapted to convert an RF signal received by the receiver module 110 to a baseband signal for further processing. For example, the CSPM 120 may comprise a frequency synthesizer (local oscillator, phase lock loop, etc.) that provides a mixing signal to a mixer. Such a mixer (e.g., and other circuitry) may then convert a received RF signal to an intermediate frequency signal or a baseband signal. In another non-limiting exemplary scenario, the CSPM 120 may be adapted to receive a baseband signal from the receiver module 110 and thus, conversion to baseband might be unnecessary.

The CSPM 120 may, for example, comprise any of a variety of demodulating and/or decoding circuitry that is adapted to determine information that is communicated by a received communication signal. Such information may, for example and without limitation, comprise audio, video, graphical, pictorial, textual, numerical, procedural, operational, protocol, addressing, source/destination or general data information. In a non-limiting exemplary scenario, such information may comprise information identifying a particular communication network and/or identifying whether the communication network has a message waiting for delivery to the mobile communication device 100. Such information may, for example and without limitation, be communicated in a packet or frame header and/or payload. The following discussion will at times refer to characteristics of a communication signal that are directly related to particular communicated information as "informational characteristics" of the received communication signal.

As discussed previously, the CSPM 120 may be adapted to operate in one or more energy-saving (or "sleep") modes. A sleep mode may generally be considered to be an operating mode generally associated with reduced power consumption relative to an awake (or "normal") mode. For example and without limitation, while operating in a sleep mode, the CSPM 120 might perform no processing or relatively little processing on a received communication signal 118. Also for example, while operating in a sleep mode, the CSPM 120 might operate at a lower speed and/or lower degree of precision or accuracy than when not operating in a sleep mode.

Further for example, the CSPM 120, while operating in a sleep mode, might operate at a lower clock speed, lower current level and/or lower voltage level than when not operating in a sleep mode. Still further for example, the CSPM 120, while operating in a sleep mode, might operate with a reduced set of functionality than when not operating in a sleep mode. Yet further for example, the CSPM 120, while operating in a sleep mode, might operate at a reduced quality-of-service ("QoS") level than when not operating in a sleep mode.

In general, the CSPM 120 may be adapted to operate in one or more sleep modes, which may be characterized by any of a variety of characteristics generally associated with sleep mode (or energy-saving mode) operation. Accordingly, the scope of various aspects of the present invention should not be limited by particular sleep mode characteristics.

The exemplary mobile communication device 100 may comprise a signal characteristic detection and analysis module 130 ("SCDAM") that is adapted to determine (or detect) any of a large variety of signal characteristics of a received signal. Such signal characteristics may, for example, comprise non-informational signal characteristics (i.e., characteristics of a communication signal that are not directly related to particular information being communicated by the communication signal). The SCDAM 130 may then be adapted to determine, based on one or more signal characteristics of a received communication signal, whether to operate the CSPM 120 in one or more sleep modes or in a mode where the CSPM 120 processes a received communication signal (e.g., determining information communicated by a received communication signal). The following discussion will include a non-limiting set of exemplary scenarios of such signal characteristic detection and operating mode determination.

In a first non-limiting exemplary scenario, the SCDAM 130 may be adapted to determine an amount of energy associated with the received communication signal 118. The SCDAM 130 may utilize any of a variety of hardware and/or software (e.g., an envelope detector or received signal strength indicator) to determine such an amount of energy (or signal strength). The SCDAM 130 may then be adapted to determine whether to operate the CSPM 120 in a sleep mode or in a non-sleep mode based, at least in part, on the determined amount of energy (or signal strength). For example and without limitation, the SCDAM 130 may require the received communication signal 118 to be associated with at least a threshold amount of energy before the SCDAM 130 determines to wake the CSPM 120 from a sleep mode.

In a second non-limiting exemplary scenario, the SCDAM 130 may be adapted to determine a frequency characteristic of the received communication signal 118. Such a frequency characteristic may, for example, comprise signal presence (and/or level) at a particular frequency, particular set of frequencies, or over a particular frequency range. Such a frequency characteristic may, for example, comprise characteristics of a spectral signature or footprint. Such a frequency characteristic may also, for example, comprise characteristics of a beat frequency or a frequency hopping sequence. Such a frequency characteristic may further, for example, comprise characteristics associated with a particular spread spectrum technique, such as, direct sequence spread spectrum or frequency hopping spread spectrum. The SCDAM 130 may utilize any of a variety of hardware and/or software (e.g., various types of filters) to determine the frequency characteristic. The SCDAM 130 may then be adapted to determine whether to operate the CSPM 120 in a sleep mode or in a non-sleep mode based, at least in part, on the determined frequency characteristic. For example and without limitation, the SCDAM 130 may require the received communication signal 118 to be in a particular frequency range (e.g., in a frequency band allocated to a particular type of communication network) before the SCDAM 130 determines to wake the CSPM 120 from a sleep mode.

In a third non-limiting exemplary scenario, the SCDAM 130 may be adapted to determine a timing characteristic of the received communication signal 118. Such a timing characteristic may, for example, comprise a time pattern (e.g., signal duration, spacing interval, etc.) associated with the received communication signal 118 (e.g., beacon or polling signal timing, sync signal timing, header/payload timing, etc.). The SCDAM 130 may utilize any of a variety of types of circuitry (e.g., various clock and signal monitor circuitry or software) to determine the timing characteristic. The SCDAM 130 may then be adapted to determine whether to operate the CSPM 120 in a sleep mode or in a non-sleep mode based, at least in part, on the determined timing characteristic. For example and without limitation, the SCDAM 130 may require the received communication signal 118 to exhibit timing characteristics associated with a beacon of a particular type of communication network before the SCDAM 130 determines to wake the CSPM 120 from a sleep mode.

In a fourth non-limiting exemplary scenario, the SCDAM 130 may be adapted to determine a modulation characteristic of the received communication signal 118. Such a modulation characteristic may, for example, comprise any of a large variety of signal characteristics associated with particular modulation techniques. Such modulation characteristics may, for example and without limitation, comprise characteristics associated with frequency modulation, phase modulation, n-QAM modulation, amplitude modulation, code modulation, FSK modulation, PSK/QPSK modulation, etc. The SCDAM 130 may utilize any of a variety of hardware and/or software (e.g., frequency, phase and/or amplitude measuring circuitry) to detect and/or determine modulation characteristics of the received communication signal 118. The SCDAM 130 may then be adapted to determine whether to operate the CSPM 120 in a sleep mode or in a non-sleep mode based, at least in part, on the determined modulation characteristic. For example and without limitation, the SCDAM 130 may require the received communication signal 118 to be associated with 16-QAM modulation (e.g., associated with a particular communication network) before the SCDAM 130 determines to wake the CSPM 120 from a sleep mode.

In a fifth non-limiting exemplary scenario, the SCDAM 130 may be adapted to determine a protocol characteristic of the received communication signal 118. Such a protocol characteristic may comprise signal characteristics associated with any of a large variety of communication protocols (e.g., standard or proprietary protocols). For example and without limitation, such a protocol characteristic may correspond to a synchronization signal characteristic, a beacon signal characteristic, a preamble characteristic, a header/payload characteristic, a time duration characteristic, etc. Also for example, such a protocol characteristic may be associated with a particular PHY or MAC layer. The SCDAM 130 may utilize any of a variety of hardware and/or software (e.g., timers, frequency/amplitude detectors, counters, etc.) to detect or determine a protocol characteristic. The SCDAM 130 may then be adapted to determine whether to operate the CSPM 120 in a sleep mode or in a non-sleep mode based, at least in part, on the determined protocol characteristic. For example and without limitation, the SCDAM 130 may require the received communication signal 118 have a particular preamble duration or pattern (e.g., associated with a particular communication protocol, which in turn, is associated with a particular communication network of interest) before the SCDAM 130 determines to wake the CSPM 120 from the sleep mode.

Though the previous examples, at times, discussed determination and analysis of single communication signal characteristics, it should be recognized that various signal characteristics might be combined. For example and without limitation, the SCDAM 130 may require the received communication signal 118 to have particular frequency, beacon timing and modulation characteristics before waking the CSPM 120 from a sleep mode. Also for example, the SCDAM 130 may require the received communication signal 118 to exceed a signal strength threshold and match a particular beacon timing pattern before waking the CSPM 120 from a sleep mode.

It should also be recognized that the previous exemplary scenarios are non-limiting examples. Many other signal characteristics may be determined and/or analyzed. Accordingly, the scope of various aspects of the present invention should not be limited by particular signal characteristics (e.g., non-informational signal characteristics), a particular number of signal characteristics, or particular hardware and/or software for determining and analyzing such signal characteristics.

Figure 2:
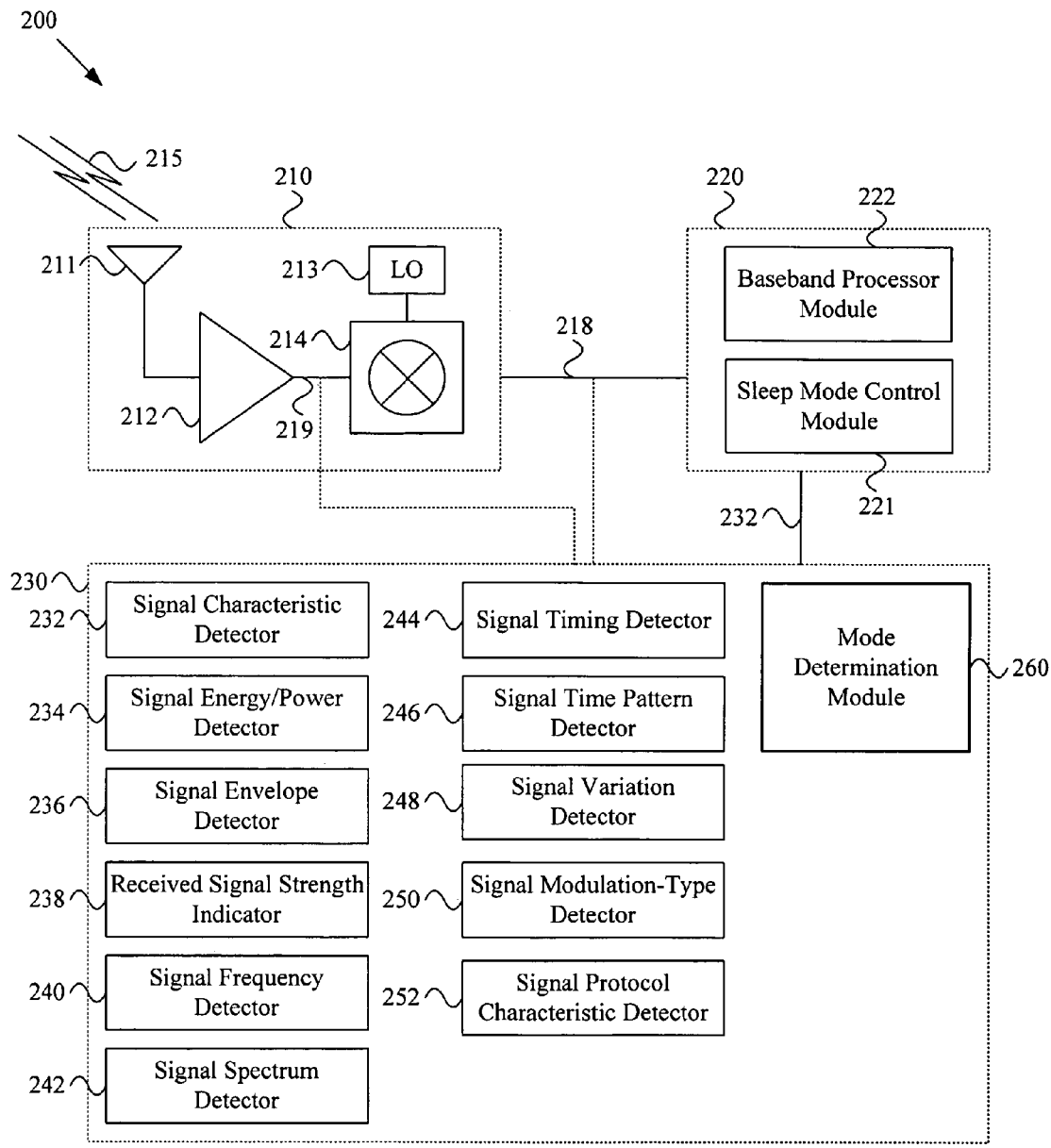
FIG. 2 is a diagram illustrating a portion of a mobile communication device, in accordance with various aspects of the present invention.

FIG. 2 is a diagram illustrating a portion of a mobile communication device 200, in accordance with various aspects of the present invention. The exemplary mobile communication device 200 may, for example and without limitation, share any or all characteristics of the exemplary mobile communication device 200 illustrated in FIG. 1 and discussed previously.

The exemplary mobile communication device 200 may comprise a receiver module 210 that is adapted to receive at least one communication signal 215. The receiver module 210 may, for example and without limitation, share any or all characteristics with the receiver module 110 of the mobile communication device 100 illustrated in FIG. 1 and discussed previously.

For example, the receiver module 210 may comprise characteristics of an RF receiver, and the communication signal 215 may comprise characteristics of an RF signal. The following discussion may generally discuss the received communication signal 215 as a wireless signal (e.g., an RF signal). However, the communication signal 215 may comprise characteristics of any of a variety of signals associated with various communication media (e.g., a wire signal, RF signal, tethered optical signal, non-tethered optical signal, etc.). Further, the communication signal 215 may conform to any of a variety of communication protocols. Accordingly, the receiver module 210 may comprise characteristics of any of a variety of receivers associated with such signals.

The receiver module 210 may comprise an antenna 211 and a low-noise amplifier 212. The receiver module 210 may receive an RF communication signal 215 through the antenna 211 and low-noise amplifier 212. In the non-limiting configuration illustrated in FIG. 2, the receiver module 210 may also comprise at least one local oscillator 213 and a mixing module 214. The local oscillator 213 may comprise characteristics of any of a variety of oscillators, frequency generators, phase lock loops, etc. The mixing module 214 may comprise characteristics of any of a variety of types of mixers.

In such an exemplary configuration, the mixing module 214 may receive a mixing (or reference) signal from the local oscillator 213 and receive the amplified RF signal 219 from the low-noise amplifier 212. The mixing module 214 may then output a baseband signal 218 formed from the received RF communication signal 215.

It should be understood that the local oscillator 213 and mixing module 214 are merely illustrative and non-limiting. The configuration of the receiver module 210 may comprise characteristics of any of a large variety of radio configurations. For example, the receiver module 210 may comprise a plurality of mixing stages, each with respective mixers and frequency synthesizers. The scope of various aspects of the present invention should not be limited by characteristics of any particular receiver module configuration.

It should also be understood that the local oscillator 213 and mixing module 214 are illustrated as a portion of the receiver module 210. In various alternative exemplary configurations, the local oscillator 213, mixing module 214 and associated circuitry may instead, or additionally, be a portion of the communication signal-processing module 220 or other module. Accordingly, the scope of various aspects of the present invention should not be limited by arbitrary boundaries between various functional modules.

The following discussion will include various examples of analyzing a received communication signal. Various examples may apply to an RF communication signal, various examples may apply to a baseband communication signal, and various examples may apply to either of an RF or baseband signal. Additionally, various examples may also apply to various IF communication signals.

The exemplary mobile communication device 200 may comprise a communication signal-processing module 220 ("CSPM"). The CSPM 220 may, for example and without limitation, share any or all characteristics with the CSPM 120 of the exemplary mobile communication device 100 illustrated in FIG. 1 and discussed previously.

The CSPM 220 may, for example, comprise a sleep mode control module 221 adapted to operate the CSPM 220, or portions thereof, in one or more sleep modes. The CSPM 220 may also, for example, be adapted to process a received communication signal in any of a variety of manners. For example, the CSPM 220 may comprise a baseband processor 222 adapted to process the baseband signal 218. The CSPM 220 may, for example, be adapted to determine information that is communicated by the baseband signal 218. As discussed previously with regard to FIG. 1, such information may comprise characteristics of any of a variety of types of communicated information. Also as discussed previously, the following discussion will at times refer to characteristics of a communication signal (e.g., the baseband signal 218 or amplified RF signal 219) that are directly related to particular communicated information as "informational characteristics" of the communication signal.

Such a baseband processor 222 may comprise characteristics of any of a variety of baseband processors or components thereof. For example, the baseband processor 222 may comprise characteristics of various symbol detectors, decoders/encoders and decryption/encryption circuitry. The baseband processor 222 may, for example, comprise characteristics of any of a large variety of signal processing components, including for example, hardware and/or software utilized to determine and utilize information communicated in a baseband signal.

As discussed previously, the sleep mode control module 221 may be adapted to operate the CSPM 220 (or a portion thereof, e.g., the baseband processor 222) in one or more energy-saving (or "sleep") modes. Also as discussed previously, a sleep mode may generally be considered to be an operating mode generally associated with reduced power consumption relative to an awake (or "normal") mode. For example and without limitation, the sleep mode control module 221 may, while operating the CSPM 220 in a sleep mode, cause the CSPM 220 (e.g., the baseband processor 222 or portion thereof) to perform no processing or relatively little processing on the baseband signal 218. Also for example, while operating the CSPM 220 in a sleep mode, the sleep mode control module 221 might cause the CSPM 220 to operate at a lower speed and/or lower degree of precision or accuracy than when not operating in a sleep mode.

Further for example, the sleep mode control module 221, while operating the CSPM 220 in a sleep mode, might cause the CSPM 220 (e.g., the baseband processor 222 or portion thereof) to operate at a lower clock speed, lower current level and/or lower voltage level than when not operating in a sleep mode. Still further for example, the sleep mode control module 221, while operating the CSPM 220 in a sleep mode, might operate the CSPM 220 (e.g., the baseband processor 222 or portion thereof) with a reduced set of functionality than when not operating in a sleep mode. Yet further for example, the sleep mode control module 221, while operating the CSPM 220 in a sleep mode, might operate the CSPM 220 (e.g., the baseband processor 222 or portion thereof) at a reduced quality-of-service ("QoS") level than when not operating in a sleep mode.

In general, the sleep mode control module 221 may be adapted to operate the CSPM 220, or portion thereof, in one or more sleep modes, which may be characterized by any of a variety of characteristics generally associated with sleep mode (or energy-saving mode) operation. Accordingly, the scope of various aspects of the present invention should not be limited by particular sleep mode characteristics.

As mentioned previously, the local oscillator 213 and/or mixing module 214 may alternatively be part of the CSPM 220. In such an exemplary scenario, the sleep mode control module 221 may also control sleep mode characteristics of the local oscillator 213, mixing module 214 or any associated circuitry. For example, the sleep mode control module 221 may be adapted to control operation of oscillator (or frequency synthesis) circuitry. The sleep mode control module 221 may, for example, be adapted to control operation of phase lock loop circuitry (e.g., turning such circuitry off or operating such circuitry at a reduced performance level during a sleep mode).

As discussed previously with regard to the SCDAM 130 of FIG. 1, the SCDAM 230, which will be discussed below, may be adapted to analyze signal characteristics of a received RF communication signal 219, an IF communication signal or a baseband communication signal 218. Thus, depending on the particular signal characteristic being analyzed by the SCDAM 230, frequency generating, locking and mixing circuitry may or may not be necessary to perform the analysis. Accordingly, when the SCDAM 230 is analyzing one of a first set of signal characteristics (e.g., amplified RF communication signal 219 characteristics), the sleep mode control module 221 might be operating the local oscillator 213, mixer module 214 and associated circuitry in a sleep mode. Alternatively, when the SCDAM 230 is analyzing one of a second set of signal characteristics (e.g., baseband communication signal 218 characteristics), the sleep mode control module 221 might be operating the local oscillator 213, mixer module 214 and associated circuitry may be operating normally.

The exemplary mobile communication device 200 may comprise a signal characteristic detection and analysis module 230 ("SCDAM") that is adapted to determine (or detect) any of a large variety of signal characteristics of a received communication signal (e.g., RF, IF or baseband communication signal). The SCDAM 230 may comprise any of a variety of sub-modules, non-limiting examples of which will be presented below, to perform such determination/detection. Such signal characteristics may, for example, comprise non-informational signal characteristics (i.e., characteristics of a communication signal that are not directly related to information being communicated by the communication signal).

The SCDAM 230 may also comprise a mode determination module 260 adapted to determine, based on one or more signal characteristics of a received communication signal, whether to operate the CSPM 220 (or a portion thereof, e.g., the baseband processor 222) in one or more sleep modes or in a mode where the CSPM 220 processes a received communication signal (e.g., determining information communicated by the baseband communication signal 218). The mode determination module 260 may perform such determination in any of a variety of manners, depending on the signal characteristic(s) being analyzed. For example and without limitation, the mode determination module 260 may be adapted to perform threshold comparison, averaging, weighted averaging, variability determining, pattern comparing, spectrum matching, etc. The mode determination module 260 may, for example, be adapted to compare detected or determined signal characteristics to particular signal characteristics that have been associated with operating the CSPM 220 normally. The mode determination module 260 may then, for example, communicate with the sleep mode control module 221 via a mode control signal 232 to cause operation of the CSPM 220 in the desired mode.

The following discussion will include a non-limiting set of examples of CSPM 220 modules performing such signal characteristic detection/determination and operating mode determination.

The SCDAM 230 may comprise a general signal characteristic detector 232 adapted to determine any of a variety of general signal characteristics. The general signal characteristic detector 232 may comprise any of a variety of hardware and/or software to detect or determine general signal characteristics (e.g., non-informational signal characteristics). Specific non-limiting examples of detection/determination of specific signal characteristics will be provided below. The mode determination module 260 may then be adapted to determine whether to operate the CSPM 220 in a sleep mode or in a non-sleep mode based, at least in part, on the determined general signal characteristic(s).

The SCDAM 230 may, for example, comprise a signal energy/power detector 234 adapted to determine an amount of energy (or other measure of signal strength) associated with a communication signal (e.g., the amplified RF communication signal 219 or baseband communication signal 218). The signal energy/power detector 234 may utilize any of a variety of hardware and/or software (e.g., an envelope detector 236 or received signal strength indicator 238) to determine such an amount of energy (or signal strength). The mode determination module 260 may then be adapted to determine whether to operate the CSPM 220 (or portion thereof) in a sleep mode or in a non-sleep mode based, at least in part, on the determined amount of energy (or signal strength). For example and without limitation, the mode determination module 260 may require the communication signal to be associated with at least a threshold amount of energy (or signal strength) before the mode determination module 260 determines to wake the CSPM 220 from a sleep mode.

The SCDAM 230 may also, for example, comprise a signal frequency detector 240 and/or signal spectrum detector 242 adapted to determine a frequency characteristic of a received communication signal (e.g., the amplified RF communication signal 219 or baseband communication signal 218). Such a frequency characteristic may, for example, comprise signal presence (and/or level) at a particular frequency, a particular set of frequencies, or over a particular frequency range. Such a frequency characteristic may, for example, comprise characteristics of a spectral signature or footprint. Such a frequency characteristic may also, for example, comprise characteristics of a beat frequency or a frequency hopping sequence. Such a frequency characteristic may further, for example, comprise characteristics associated with a particular spread spectrum technique, such as, direct sequence spread spectrum or frequency hopping spread spectrum. The signal frequency detector 240 and/or signal spectrum detector 242 may utilize any of a variety of hardware and/or software (e.g., various types of filters) to determine the frequency characteristic. The mode determination module 260 may then be adapted to determine whether to operate the CSPM 220 (or portion thereof) in a sleep mode or in a non-sleep mode based, at least in part, on the determined frequency characteristic. For example and without limitation, the mode determination module 260 may require the received communication signal to be in a particular frequency range (e.g., in a frequency band allocated to a particular type of communication network) before the mode determination module 260 determines to wake the CSPM 220 from a sleep mode.

The SCDAM 130 may additionally, for example, comprise a signal-timing detector 244, signal time pattern detector 246 and/or signal variation detector 248 adapted to determine a timing characteristic of a received communication signal (e.g., the amplified RF communication signal 219 or baseband communication signal 218). Such a timing characteristic may, for example, comprise a time pattern (e.g., signal duration, spacing interval, etc.) associated with the received communication signal (e.g., beacon or polling signal timing, sync signal timing, header/payload timing, etc.). The signal-timing detector 244, signal time pattern detector 246 and/or signal variation detector 248 may utilize any of a variety of circuitry (e.g., various clock and signal monitor circuitry or software) to determine the timing characteristic. The mode determination module 260 may then be adapted to determine whether to operate the CSPM 220 (or portion thereof) in a sleep mode or in a non-sleep mode based, at least in part, on the determined timing characteristic. For example and without limitation, the mode determination module 260 may require the received communication signal to exhibit timing characteristics associated with a beacon of a particular type of communication network before the mode determination module 260 determines to wake the CSPM 220 from a sleep mode.

The SCDAM 230 may further, for example, comprise a signal modulation-type detector 250 adapted to determine a modulation characteristic of a received communication signal (e.g., the amplified RF communication signal 219 or baseband communication signal 218). Such a modulation characteristic may, for example, comprise any of a large variety of signal characteristics associated with particular modulation techniques. Such modulation characteristics may, for example and without limitation, comprise characteristics associated with frequency modulation, phase modulation, n-QAM modulation, amplitude modulation, code modulation, FSK modulation, PSK/QPSK modulation, etc. The signal modulation-type detector 250 may utilize any of a variety of circuitry and/or software (e.g., frequency, phase and/or amplitude measuring circuitry) to detect and/or determine modulation characteristics of a received communication signal. The mode determination module 260 may then be adapted to determine whether to operate the CSPM 220 (or portion thereof) in a sleep mode or in a non-sleep mode based, at least in part, on the determined modulation characteristic. For example and without limitation, the mode determination module 260 may require a received communication signal to be associated with 16-QAM modulation (e.g., associated with a particular communication network) before the mode determination module 260 determines to wake the CSPM 220 from a sleep mode.

The SCDAM 230 may still further, for example, comprise a signal protocol characteristic detector 252 adapted to determine a protocol characteristic of a received communication signal (e.g., the amplified RF communication signal 219 or baseband communication signal 218). Such a protocol characteristic may comprise signal characteristics associated with any of a large variety of communication protocols (e.g., standard or proprietary protocols). For example and without limitation, such a protocol characteristic may correspond to a synchronization signal characteristic, a beacon signal characteristic, a preamble characteristic, a header/payload characteristic, a time duration characteristic, etc. Also for example, such a protocol characteristic may be associated with a particular PHY or MAC layer. The signal protocol characteristic detector 252 may utilize any of a variety of hardware and/or software (e.g., timers, frequency/amplitude detectors, counters, etc.) to detect or determine a protocol characteristic of a communication signal. The mode determination module 260 may then be adapted to determine whether to operate the CSPM 220 (or portion thereof) in a sleep mode or in a non-sleep mode based, at least in part, on the determined protocol characteristic. For example and without limitation, the mode determination module 260 may require a received communication signal to have a particular preamble duration or pattern (e.g., associated with a particular communication protocol, which in turn, is associated with a particular communication network of interest) before the mode determination module 260 determines to wake the CSPM 220 from a sleep mode.

Though the previous examples, at times, discussed determination and analysis of single communication signal characteristics, it should be recognized that various signal characteristics might be combined. For example and without limitation, the mode determination module 260 may require a received communication signal to have particular frequency, beacon timing and modulation characteristics before waking the CSPM 220 from a sleep mode. Also for example, the mode determination module 260 may require a received communication signal to exceed a signal strength threshold and match a particular beacon timing pattern before waking the CSPM 220 from a sleep mode.

It should also be recognized that the previous exemplary scenarios are non-limiting examples. The SCDAM 230 may comprise any of a variety of modules to detect or determine any of a variety of other signal characteristics (e.g., non-informational signal characteristics). Accordingly, the scope of various aspects of the present invention should not be limited by particular signal characteristics (e.g., non-informational signal characteristics), a particular number of signal characteristics, or particular hardware and/or software for determining and analyzing such signal characteristics.

The exemplary mobile communication devices 100, 200 illustrated in FIGS. 1-2 may be implemented utilizing any of a variety of components (e.g., hardware and/or a combination of hardware and software). Further, various portions of the exemplary communication devices 100, 200 may be implemented in independent integrated circuits and/or integrated into a single integrated circuit. For example and without limitation, the SCDAMs 130, 230 and CSPMs 120, 220 may be integrated into a single integrated circuit. Also for example, the receiver modules 110, 210, SCDAMs 130, 230 and CSPMs 120, 220 may be integrated into a single integrated circuit. The scope of various aspects of the present invention should not be limited by characteristics of any particular hardware and/or software implementation or by any particular degree of integration.

Figure 3:
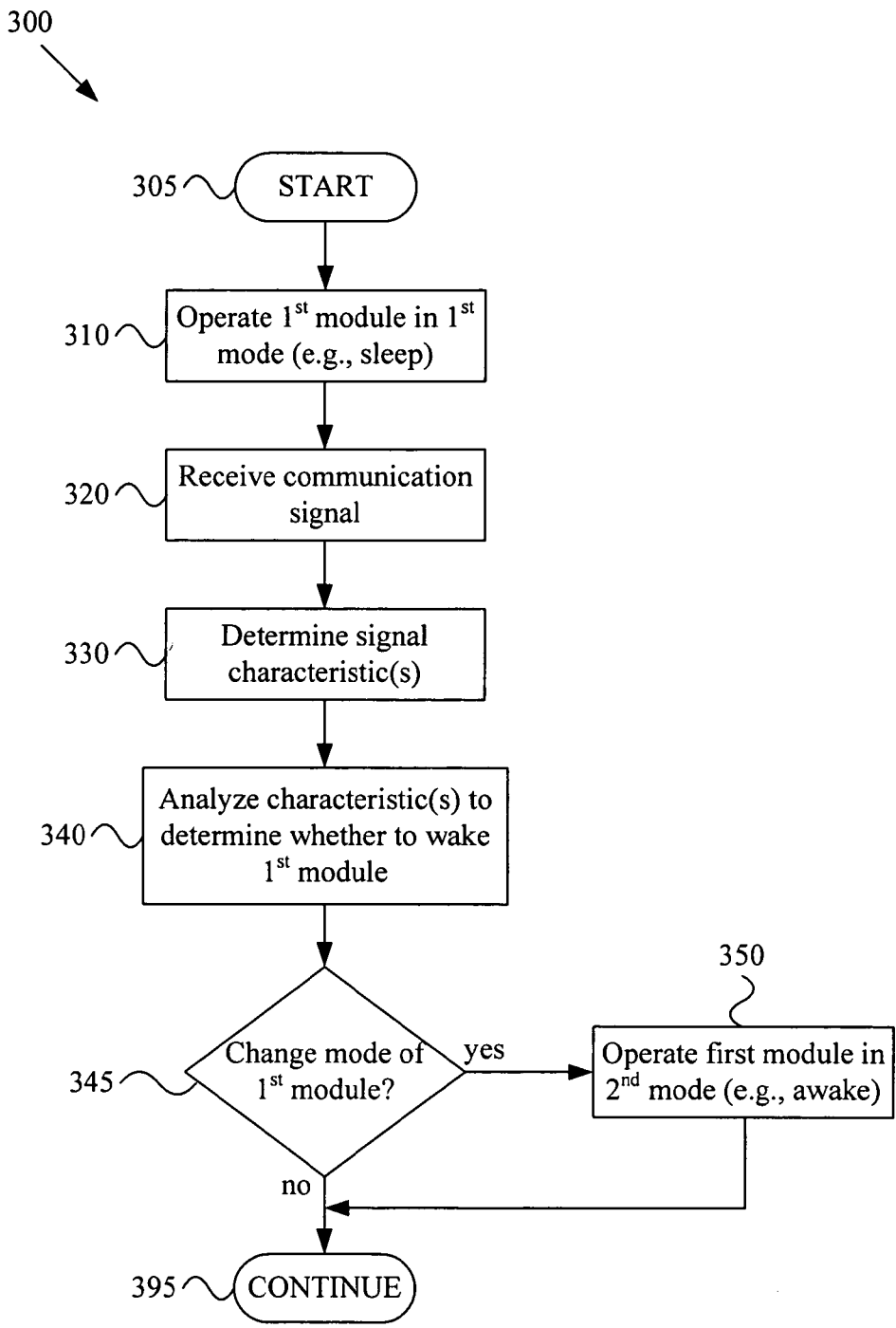
FIG. 3 is a diagram illustrating a method, in a mobile communication device, for operating the mobile communication device in an energy-efficient manner, in accordance with various aspects of the present invention.

FIG. 3 is a diagram illustrating a method 300, in a mobile communication device, for operating the mobile communication device in an energy-efficient manner, in accordance with various aspects of the present invention. The exemplary method 300 may, for example and without limitation, share any or all functional characteristics with the exemplary mobile communication devices 100, 200 illustrated in FIGS. 1-2 and discussed previously. The mobile communication device may, for example, comprise a first module (e.g., hardware and/or software) adapted to operate in a plurality of operating modes. Such modes may, for example, comprise one or more sleep modes and a normal operating mode.

The exemplary method 300 begins executing at step 305. The exemplary method 300 (and other methods discussed herein) may begin executing for any of a variety of reasons. For example and without limitation, the exemplary method 300 may begin executing in response to an explicit command to begin or in accordance with an operating profile. Also for example, the exemplary method 300 may begin executing in response to detecting a particular time period of inactivity with the mobile communication device. Further for example, the exemplary method 300 may begin executing in response to a determined amount of energy remaining in a finite energy supply. The scope of various aspects of the present invention should not be limited by any particular initiating causes or conditions.

The exemplary method 300 may, at step 310, comprise operating a first module of the mobile communication device in a first mode. The first mode may, for example, be characterized by various sleep mode characteristics. Various sleep mode characteristics were discussed previously, for example, with regard to the CSPM 120 of FIG. 1. For example and without limitation, various sleep mode characteristics may comprise (e.g., relative to a normal operating mode) operating with no processing, relatively little processing, lower speed, lower accuracy, lower precision, lower clock rate, lower current level, lower voltage level, less functionality, reduced QoS, etc. Various sleep mode characteristics may also comprise shutting off particular circuits (e.g., frequency synthesizers, phase lock loops, processors, decoders, user interfaces, etc.).

The exemplary method 300 may, at step 320, comprise receiving a communication signal. Step 320 may, for example and without limitation, share various functional characteristics with the receiver modules 110, 210 illustrated in FIGS. 1-2. The following discussion may generally discuss receiving a wireless communication signal (e.g., an RF communication signal). However, a received communication signal may comprise characteristics of any of a variety of signals associated with various communication media (e.g., a wire signal, RF signal, tethered optical signal, non-tethered optical signal, etc.).

Step 320 may, for example, comprise receiving the communication signal in accordance with any of a variety of communication protocols (e.g., GSM/EDGE, GPRS, CDMA, WCDMA, TDMA, PDC, DVB-H, IEEE 802.11, IEEE 802.15, Bluetooth, Zigbee, UltraWideBand, Ethernet, Token Ring, etc.).

Step 320 may, for example, comprise utilizing any of a variety of modules, components or devices to receive the communication signal. For example, step 320 may comprise receiving an RF communication signal through an antenna and low-noise amplifier. Also for example, step 320 may comprise receiving a baseband communication signal through an antenna, low-noise amplifier and mixer circuitry (e.g., utilizing a local oscillator, frequency synthesis circuitry, phase lock loop circuitry, etc.).

The following discussion will include various examples of analyzing a communication signal. Various examples may apply to an RF communication signal, various examples may apply to a baseband communication signal, and various examples may apply to either of an RF or baseband communication signal. Additionally, various examples may also apply to various IF communication signals. Thus, step 320 may comprise receiving any of a variety of types of communication signal.

The exemplary method 300 may, at step 330, comprise determining one or more characteristics of the signal received at step 320. Step 330 may, for example and without limitation, share any or all of the functional characteristics of the SCDAMs 130, 230 (e.g., various modules 232-252) illustrated in FIGS. 1-2 and discussed previously.

Such signal characteristics may, for example, comprise non-informational signal characteristics, which were generally discussed previously. Such characteristics may, for example, comprise signal characteristics at the RF, IF or baseband level. For example and without limitation, such signal characteristics may comprise energy characteristics, frequency/spectral characteristics, timing characteristics, modulation characteristics, protocol characteristics, etc.

Step 330 may comprise utilizing any of a large variety of hardware and/or software of the mobile communication device to detect or determine various signal characteristics. The characteristics of the hardware and/or software depend on the particular signal characteristic(s) being detected or determined.

The exemplary method 300 may, at step 340, comprise analyzing the one or more signal characteristics determined at step 330 to determine whether to operate the first module in a mode other than the first mode (e.g., into which the first module was placed at step 310). Step 340 may, for example and without limitation, share any or all of the functional characteristics of the SCDAMs 130, 230 (e.g., the mode determination module 260) illustrated in FIGS. 1-2 and discussed previously.

Based on the one or more signal characteristics determined at step 330, step 340 may comprise determining whether to operate the first module in a sleep mode or in a mode where, for example, the first module processes the received communication signal. The first module, for example when awake, may be adapted to process the received communication signal in any of a variety of manners. For example, the first module may be adapted to determine various types of information communicated by the received communication signal. As discussed previously with regard to the CSPMs 120, 220, the first module may be adapted to determine various informational characteristics of the received communication signal.

Step 340 may comprise making such determination in any of a variety of manners. For example and without limitation, step 340 may comprise performing threshold comparison, averaging, weighted averaging, variability determining, pattern comparing, spectrum matching, etc. Step 340 may, for example, comprise comparing detected or determined signal characteristics to particular signal characteristics that have been associated with operating the first module normally.

The exemplary method 300 may, at step 345, comprise controlling execution flow of the method 300 based, at least in part, on the determination made at step 340. If, for example, step 340 comprises determining that the first module is to remain in the first mode (e.g., a sleep mode), then step 345 may comprise directing execution flow of the exemplary method 300 to step 395 for continued processing. If, for example, step 340 comprises determining that the first module is to operate in a mode other than the first mode (e.g., a normal communication signal processing mode), then step 345 may comprise directing execution flow of the exemplary method 300 to step 350.

The exemplary method 300 may, at step 350, comprise operating the first module in a mode other than the first mode (e.g., in a "normal" or "awake" mode). Step 350 may, for example, change the operating mode of the first module in any of a variety of manners, some of which were discussed previously with regard to the sleep mode control module 221 of FIG. 2.

The exemplary method 300 may, at step 395, comprise performing any of a variety of continued processing. For example and without limitation, step 395 may comprise returning execution flow of the exemplary method back up to step 320 for continued reception and analysis of communication signals. Further for example, step 395 may comprise waiting for a time delay before continuing operation. In an exemplary scenario, where the method 300 comprised changing operating modes of the first module at step 350, step 395 may comprise operating the first module in a new operating mode (e.g., a non-sleep mode) to process the received communication signal. Such processing may, for example, comprise determining informational characteristics of the received communication signal and analyzing and/or utilizing the determined informational characteristics.

The exemplary method 300 was presented to provide a specific illustration of various generally broader aspects of the present invention. Accordingly, the scope of various aspects of the present invention should not be limited by particular characteristics of the exemplary method 300.

Figure 4:
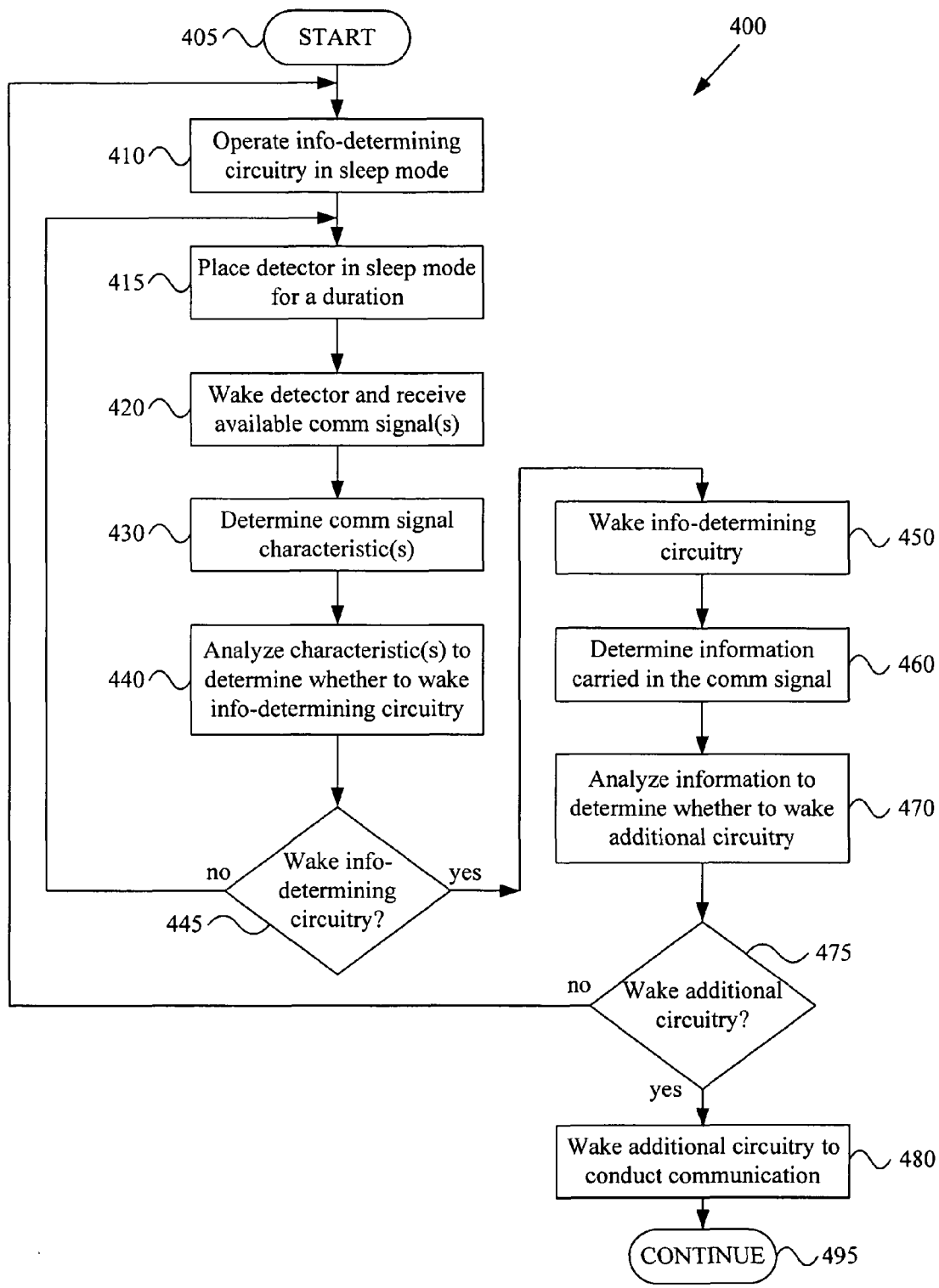
FIG. 4 is a diagram illustrating a method, in a mobile communication device, for operating the mobile communication device in an energy-efficient manner, in accordance with various aspects of the present invention.

FIG. 4 is a diagram illustrating a method 400, in a mobile communication device, for operating the mobile communication device in an energy-efficient manner, in accordance with various aspects of the present invention. The exemplary method 400 may, for example and without limitation, share various characteristics with the exemplary method 300 illustrated in FIG. 3 and discussed previously.

The exemplary method 400 may, at step 410, comprise operating a first module (e.g., information-determining circuitry) in a sleep state. Step 410 may, for example and without limitation, share any or all characteristics with step 310 of the exemplary method 300 illustrated in FIG. 3.

The exemplary method 400 may, at step 415, comprise operating a second module (e.g., a communication signal detector) in a sleep mode. The second module may, for example and without limitation, share any or all functional characteristics with the SCDAMs 130, 230 illustrated in FIGS. 1-2 and discussed previously. As discussed previously, a sleep mode may comprise any of a variety of operating characteristics associated with sleep mode operation. For example and without limitation, step 415 may comprise completely shutting down the second module or significantly reducing the processing performed by the second module. Also for example, step 415 may comprise operating the second module at reduced speed, power consumption, power supply, voltage level, current level, accuracy level, functionality amount, etc.

The exemplary method 400 may, at step 420, comprise waking the second module (e.g., a communication signal detector) and receiving one or more communication signals (if available). Step 420 may comprise waking the second module in response to any of a variety of causes or conditions (e.g., timer expiration or received command). Step 420 may, for example and without limitation, share various characteristics discussed previously with regard to the sleep mode control module 221 of FIG. 2.

The exemplary method 400 may, at step 430, comprise determining one or more characteristics (e.g. non-informational signal characteristics) of a communication signal received at step 420. Step 430 may, for example and without limitation, share any or all characteristics with step 330 of the exemplary method 300 illustrated in FIG. 3.

The exemplary method 400 may, at step 440, comprise analyzing the one or more signal characteristics determined at step 430 to determine whether to operate the first module (e.g., information-determining circuitry) in a mode different from the first mode (e.g., a sleep mode into which the first module was placed at step 410). Step 440 may, for example and without limitation, share any or all characteristics with step 340 of the exemplary method 300 illustrated in FIG. 3.

The exemplary method 400 may, at step 445, comprise controlling execution flow of the method 400 based, at least in part, on the determination made at step 440. If, for example, step 440 comprises determining that the first module is to remain in the first mode (e.g., a sleep mode), then step 445 may comprise directing execution flow of the exemplary method 400 back up to step 415 for continued communication signal receiving and analysis. If, for example, step 440 comprises determining that the first module is to operate in a mode other than the first mode (e.g., a normal communication signal-processing mode), then step 445 may comprise directing execution flow of the exemplary method 400 to step 450.

The exemplary method may, at step 450, comprise waking the first module (e.g., information-determining circuitry). Step 450 may comprise waking the first module in any of a variety of manners, depending on the characteristics of the sleep mode into which the first module was placed at step 410. As a non-limiting example, in a scenario where step 410 comprised slowing or stopping a clock signal to the first module, step 450 may comprise speeding or resuming the clock signal to the first module. Also for example, in an exemplary scenario where step 410 comprised lowering or turning off voltage to the first module, step 450 may comprise raising or turning on voltage to the first module.

The exemplary method may, at step 460, comprise determining information communicated by the received communication signal. Step 460 may, for example and without limitation, share any or all functional characteristics with the SCDAMs 130, 230 (or any modules thereof, e.g., modules 232-252). As discussed previously, such information may comprise any of a variety of characteristics. For example, such information may comprise audio, video, graphical, pictorial, textual, numerical, procedural, operational, protocol, addressing, source/destination or general data information. In a non-limiting exemplary scenario, such information may comprise information identifying a particular communication network and/or identifying whether the communication network has a message waiting for delivery to the mobile communication device.

The exemplary method may, at step 470 comprise analyzing informational characteristics of the received communication signal (e.g., information determined at step 460) to determine whether to wake additional circuitry. Such additional circuitry may, for example, comprise circuitry utilized to conduct full communications with a network access point or another mobile communication device. Such additionally circuitry may also, for example, comprise substantially all circuitry of the mobile communication device.

Step 470 may comprise analyzing any of a large variety of types of information, examples of which were presented previously. For example and without limitation, step 470 may comprise analyzing information indicative of network identification to determine whether to wake additional circuitry. In an exemplary scenario, step 470 may comprise only determining to wake additional circuitry when step 470 determines that a received communication signal corresponds to a particular communication network or group of networks.

In another exemplary scenario, step 470 may comprise analyzing addressing information (e.g., source or destination information) to determine whether to wake additional circuitry. For example, step 470 may comprise only determining to wake additional circuitry when step 470 determines that a communication signal is from a particular source or is addressed to the mobile communication device. In yet another exemplary scenario, step 470 may comprise analyzing information indicative of whether a communication network has a message awaiting delivery to the mobile communication device. For example, step 470 may comprise only determining to wake additional circuitry when step 470 determines that a communication network (e.g., from which the received communication signal originated) has a message awaiting delivery to the mobile communication device. In general, step 470 may comprise analyzing any of a large variety of information that may be communicated by a received communication signal. Accordingly, the scope of various aspects of the present invention should not be limited by characteristics of any particular type of information.

The exemplary method 400 may, at step 475, comprise controlling execution flow of the method 400 based, at least in part, on the determination made at step 470. If, for example, step 470 comprises determining that additional circuitry is to be awakened (e.g., to conduct normal communications), then step 475 may comprise directing execution flow of the exemplary method 400 to step 480 for waking the additional circuitry. If, for example, step 470 comprises determining that additional circuitry is not to be awakened, then step 475 may comprise directing execution flow of the exemplary method 400 back to step 410, where the first module may be returned to a sleep mode and additional communication signals may be received and analyzed.

The exemplary method 400 may, at step 480, comprise waking additionally circuitry (e.g., to conduct normal communications). As discussed previously with regard to step 450, step 480 may comprise waking the additional circuitry in any of a variety of manners, depending on the characteristics of the sleep mode into which the additional circuitry was previously placed. As a non-limiting example, in a scenario where the additional circuitry was placed in a sleep mode by slowing or stopping a clock signal to the additional circuitry, step 480 may comprise speeding or resuming the clock signal to the additional circuitry. Also for example, in a scenario where the additional circuitry was placed in a sleep mode by lowering or turning off voltage to the additional circuitry, step 480 may comprise raising or turning on voltage to the additional circuitry.

The exemplary method 400 may, at step 495, comprise performing additional processing. Step 495 may comprise performing any of a variety of types of additional processing. For example and without limitation, step 495 may comprise utilizing the awakened additional circuitry to conduct normal communications between the mobile communication device and another communication device (e.g., another mobile communication device or network access point). Upon completion of such communication, step 495 may comprise returning the additional circuitry to a sleep state. Also for example, step 495 may comprise waking or utilizing user interface components of the mobile communication device to communicatively couple a user of the mobile communication device to an on-going communication.

The exemplary method 400 was generally presented to provide specific illustrations of various generally broader aspects of the present invention. Accordingly, the scope of various aspects of the present invention should not be limited by characteristics of the exemplary method 400.

In summary, various aspects of the present invention provide a mobile communication device with a low power signal detector and a manner of utilizing a low power signal detector in a mobile communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A communication device, comprising:
   circuitry configured to
      communicate according to each of a plurality of communication protocols, each communication protocol being associated with a plurality of non-informational characteristics;
      operate in a plurality of modes, the plurality of modes including a sleep mode and an active mode, wherein, when in the active mode, a received communication signal is processed to determine information being communicated by the received communication signal; and
      determine whether to transition operation from the sleep mode to the active mode based at least in part on whether at least one non-informational characteristic of the received communication signal matches at least one of the non-informational characteristic of a particular one of the communication protocols.

2. The communication device of claim 1, wherein, when in the sleep mode, the circuitry does not process the received communication signal.

3. The communication device of claim 1, wherein the circuitry is configured to determine the non-informational characteristic of the received communication signal at a radio-frequency (RF) signal level.

4. The communication device of claim 1, wherein the circuitry is configured to determine the non-informational characteristic of the received communication signal at a baseband signal level.

5. The communication device of claim 1, wherein the circuitry is configured to:
   determine an amount of energy associated with the received communication signal; and
   determine whether to transition operation from the sleep mode to the active mode based at least in part on the amount of energy.

6. The communication device of claim 1, wherein the non-informational characteristic of the particular one of the communication protocols further comprises a spectral pattern.

7. The communication device of claim 1, wherein the non-informational characteristic of the particular one of the communication protocols further comprises a time pattern.

8. The communication device of claim 1, wherein the non-informational characteristic of the particular one of the communication protocols further comprises a modulation type.

9. The communication device of claim 1, wherein the non-informational characteristic of the particular one of the communication protocols further comprises a beacon characteristic.

10. The communication device of claim 1, wherein the circuitry is configured to, after determining to transition operation from the sleep mode to the active mode:
    determine network identification information communicated by the received communication signal; and
    determine, based at least in part on the network identification information, whether to wake additional circuitry from a sleep state.

11. The communication device of claim 1, wherein the circuitry is integrated into a single integrated circuit.

12. A method, comprising:
    receiving, by circuitry of a communication device, a communication signal; and
    determining, by the circuitry, whether to transition operation from a sleep mode to an active mode based at least in part on whether a non-informational characteristic of the received communication signal matches a non-informational characteristic of a particular one of a plurality of communication protocols, which are each associated with a plurality of non-informational characteristics.

13. The method of claim 12, further comprising:
    processing the received communication signal to determine information being communicated by the received communication signal when in the active mode.

14. The method of claim 12, wherein the communication device supports communication via the plurality of communication protocols, and the particular one of the plurality of communication protocols is one of the plurality of communication protocols.

15. The method of claim 12, wherein the non-informational characteristic of the particular one of the communication protocols further comprises at least one of: a spectral pattern, a time pattern, a modulation type, or a beacon characteristic.

16. The method of claim 12, further comprising:
    after determining to transition operation from the sleep mode to the active mode:
       determining network identification information communicated by the received communication signal; and
       determining, based at least in part on the network identification information, whether to wake additional circuitry from a sleep state.

17. The method of claim 12, wherein the communication device is a mobile communication device.

18. A system, comprising:
    first circuitry configured to communicate according to each of a plurality of communication protocols, each communication protocol being associated with a plurality of non-informational characteristics
    second circuitry configured to operate in at least a sleep mode and a non-sleep mode;
    third circuitry configured to determine whether to transition operation of the second circuitry from the sleep mode to the non-sleep mode based at least in part on whether at least one non-informational characteristic of a received communication signal matches at least one of the non-informational characteristic of a particular one of the plurality of communication protocols.

19. The system of claim 18, wherein, when in the non-sleep mode, the second circuitry processes the received communication signal to determine information being communicated by the received communication signal.